(12) United States Patent
Zaltsman et al.

(10) Patent No.: US 9,122,401 B2
(45) Date of Patent: Sep. 1, 2015

(54) EFFICIENT ENFORCEMENT OF COMMAND EXECUTION ORDER IN SOLID STATE DRIVES

(75) Inventors: Etai Zaltsman, Ramat-Hasharon (IL); Oren Golov, Hod-Hasharon (IL); Ori Moshe Stern, Modi'in (IL); Shai Ojalvo, Moshav Olesh (IL)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 13/593,299

(22) Filed: Aug. 23, 2012

(65) Prior Publication Data

US 2014/0059270 A1     Feb. 27, 2014

(51) Int. Cl.
*G06F 12/00* (2006.01)
*G06F 3/06* (2006.01)

(52) U.S. Cl.
CPC .............. *G06F 3/061* (2013.01); *G06F 3/0623* (2013.01); *G06F 3/0659* (2013.01)

(58) Field of Classification Search
CPC .......................... G06F 13/1689; G06F 13/4243
USPC .......................................................... 711/167
See application file for complete search history.

(56) References Cited

U.S. PATENT DOCUMENTS

| | | | | |
|---|---|---|---|---|
| 5,754,887 A * | 5/1998 | Damron et al. | .................. | 710/39 |
| 6,085,263 A * | 7/2000 | Sharma et al. | .................... | 710/56 |
| 6,466,988 B1 * | 10/2002 | Sukegawa et al. | ............ | 709/248 |
| 7,293,136 B1 | 11/2007 | More et al. | | |
| 8,307,194 B1 * | 11/2012 | Scott et al. | ...................... | 712/34 |
| 8,321,627 B1 * | 11/2012 | Norrie et al. | ................... | 711/103 |
| 2007/0074207 A1 * | 3/2007 | Bates et al. | ....................... | 718/1 |
| 2008/0005465 A1 * | 1/2008 | Matthews | ..................... | 711/113 |
| 2008/0005490 A1 * | 1/2008 | Shiraki et al. | .................. | 711/147 |
| 2008/0005940 A1 * | 1/2008 | Ollinger | ......................... | 37/452 |
| 2008/0189501 A1 * | 8/2008 | Irish et al. | ..................... | 711/167 |
| 2010/0049865 A1 * | 2/2010 | Hannuksela et al. | ......... | 709/231 |
| 2010/0106754 A1 | 4/2010 | Condit et al. | | |
| 2010/0262740 A1 * | 10/2010 | Borchers et al. | ............. | 710/263 |
| 2011/0087860 A1 * | 4/2011 | Nickolls et al. | ................. | 712/22 |
| 2011/0161552 A1 | 6/2011 | Lund et al. | | |
| 2011/0252075 A1 | 10/2011 | Ylonen et al. | | |
| 2012/0089579 A1 | 4/2012 | Ranade et al. | | |
| 2012/0089775 A1 | 4/2012 | Ranade et al. | | |
| 2013/0024630 A1 * | 1/2013 | Campbell et al. | ............. | 711/146 |

OTHER PUBLICATIONS

International Search Report and Written Opinion from PCT/US2013/054705, mailed Jan. 3, 2014, Apple Inc., p. 1-17.
International Preliminary Report on Patentability and Written Opinion from PCT/US2013/054705, mailed Mar. 5, 2015, Apple Inc., pp. 1-12.

* cited by examiner

*Primary Examiner* — Charles Rones
*Assistant Examiner* — Nanci Wong
(74) *Attorney, Agent, or Firm* — Meyertons, Hood, Kivlin, Kower & Goetzel, P.C.

(57) ABSTRACT

A method in a storage device includes receiving from a host storage commands for execution in a non-volatile memory of the storage device. At least a subset of the storage commands are to be executed in accordance with an order-of-arrival in which the storage commands in the subset are received. The received storage commands are executed in the non-volatile memory in accordance with internal scheduling criteria of the storage device, which permit deviations from the order-of-arrival, but such that execution of the storage commands in the subset reflects the order-of-arrival to the host.

18 Claims, 4 Drawing Sheets

EFFICIENT ENFORCEMENT OF COMMAND EXECUTION ORDER IN SOLID STATE DRIVES

FIELD OF THE INVENTION

The present invention relates generally to data storage, and particularly to methods and systems for implementing barrier commands.

BACKGROUND OF THE INVENTION

Various storage protocols for communicating between storage devices and hosts are known in the art. One example storage protocol is the Serial Advanced Technology Attachment (SATA) protocol that is used, for example, in mass storage equipment such as hard disks and Solid State Drives (SSDs). The SATA protocol is specified, for example, in "Serial ATA International Organization: Serial ATA Revision 3.0," Jun. 2, 2009, which is incorporated herein by reference. Another example is the NVM Express (NVMe) protocol, which is specified, for example, in "NVM Express," revision 1.0c, Feb. 16, 2012, which is incorporated herein by reference.

SUMMARY OF THE INVENTION

An embodiment of the present invention that is described herein provides a method including receiving in a storage device from a host storage commands for execution in a non-volatile memory of the storage device. At least a subset of the storage commands are to be executed in accordance with an order-of-arrival in which the storage commands in the subset are received. The received storage commands are executed in the non-volatile memory in accordance with internal scheduling criteria of the storage device, which permit deviations from the order-of-arrival, but such that execution of the storage commands in the subset reflects the order-of-arrival to the host.

In some embodiments, executing the storage commands includes permitting unblocked execution of the storage commands other than the subset concurrently with execution of the storage commands in the subset. In an embodiment, the non-volatile memory includes multiple memory devices, and executing the storage commands in accordance with the internal scheduling criteria includes scheduling the storage commands for execution across the multiple memory devices.

In a disclosed embodiment, receiving the storage commands includes receiving from the host an indication that distinguishes the storage commands in the subset from the storage commands other than the subset. In an example embodiment, receiving the storage commands includes reading the storage commands from multiple queues defined between the host and the storage device, and receiving the indication includes reading the commands in the subset from one of the queues that is predefined as an in-order queue whose storage commands are to be executed in accordance with the order-of-arrival.

In another embodiment, receiving the storage commands includes receiving from the host respective sequence numbers, which mark the storage commands in the subset in accordance with the order-of-arrival. In yet another embodiment, executing the storage commands includes performing the storage commands in the non-volatile memory in accordance with the internal scheduling policy, but acknowledging a given storage command to the host and recording the execution of the given storage command only upon successful completion of all the storage commands that precede the given storage command in the order-of-arrival.

In still another embodiment, executing the storage commands includes storing data items provided in the storage commands in the non-volatile memory, storing in the non-volatile memory respective sequence numbers that are assigned to the data items in accordance with the order-of-arrival, and, upon recovery from a disruption in the storage device, identifying a gap in the stored sequence numbers and disqualifying the storage commands whose sequence numbers follow the gap.

In some embodiments, receiving the storage commands includes reading the storage commands from multiple queues defined between the host and the storage device, including reading a barrier command that is duplicated by the host across the multiple queues, halting each queue upon identifying the barrier command in the queue, and releasing the multiple queues upon reaching the barrier command in all the queues.

There is additionally provided, in accordance with an embodiment of the present invention, apparatus including an interface and a processor. The interface is configured to receive from a host storage commands for execution in a non-volatile memory. At least a subset of the storage commands are to be executed in accordance with an order-of-arrival in which the storage commands in the subset are received. The processor is configured to execute the received storage commands in the non-volatile memory in accordance with internal scheduling criteria of the apparatus, which permit deviations from the order-of-arrival, but such that execution of the storage commands in the subset reflects the order-of-arrival to the host.

There is also provided, in accordance with an embodiment of the present invention, apparatus including a non-volatile memory and a memory controller. The memory controller is configured to receive from a host storage commands for execution in the non-volatile memory. At least a subset of the storage commands are to be executed in accordance with an order-of-arrival in which the storage commands in the subset are received. The memory controller is configured to execute the received storage commands in the non-volatile memory in accordance with internal scheduling criteria of the apparatus, which permit deviations from the order-of-arrival, but such that execution of the storage commands in the subset reflects the order-of-arrival to the host.

There is further provided, in accordance with an embodiment of the present invention, a system including a host and a storage device. The host is configured to issue storage commands. The storage device includes a non-volatile memory and is configured to receive the storage commands from the host for execution in the non-volatile memory, wherein at least a subset of the storage commands are to be executed in accordance with an order-of-arrival in which the storage commands in the subset are received, and to execute the received storage commands in the non-volatile memory in accordance with internal scheduling criteria of the storage device, which permit deviations from the order-of-arrival, but such that execution of the storage commands in the subset reflects the order-of-arrival to the host.

The present invention will be more fully understood from the following detailed description of the embodiments thereof, taken together with the drawings in which:

DETAILED DESCRIPTION OF EMBODIMENTS

Overview

When a host stores data in a non-volatile storage device, data inconsistency may develop between the host and the storage device following power interruption. For example, some non-volatile storage devices initially store the data received from the host in a volatile write buffer, and later transfer the data to non-volatile memory. This buffering mechanism improves the storage device's write performance considerably, but on the other hand may cause data inconsistency.

The storage device typically sends an acknowledgment to the host as soon as the data is placed in the write buffer, without waiting for successful transfer to the non-volatile memory. If power interruption occurs, data that is buffered but not yet committed to the non-volatile memory may be lost, even though successful storage was already acknowledged to the host.

Moreover, storage devices commonly comprise multiple memory devices, and sometimes execute storage commands out of order in accordance with some internal scheduling criteria. As a result, when power interruption occurs, there is no guarantee as to which parts of the buffered data were written successfully and which parts were lost.

In order to maintain data consistency, some storage protocols (e.g., SATA and NVMe) specify write commands that are referred to as barrier write commands. A barrier write command ensures that (i) if the data of the barrier write command is committed successfully to the non-volatile memory, it is guaranteed that all data written before the barrier write command was also committed successfully, and that (ii) if the data of the barrier write command is not committed successfully to the non-volatile memory, it is guaranteed that all data written after the barrier write command is also not committed successfully.

One possible way for the host to enforce a certain order of execution is to write all the data that needs to be committed before the barrier write, wait for all this data to be acknowledged, then issue a "flush" command that instructs the storage device to commit all the buffered data to the non-volatile memory, and, after the flush command is acknowledged, write the data that needs to be committed after the barrier write. This sort of solution, however, is problematic because the host is blocked from issuing new storage commands until the flush command is completed. Executing a flush command may halt the system for a long period of time, sometimes on the order of several hundred milliseconds.

Embodiments of the present invention that are described herein provide improved methods and systems for data storage in non-volatile storage devices such as SSDs. The disclosed techniques enable the host and the storage device to implement barrier write commands, or otherwise enforce an order of execution, in an efficient and non-blocking manner. The methods described herein are typically implemented as part of a Flash Translation Layer (FTL) in the storage device.

In some embodiments, the storage device receives from the host storage commands for execution. At least a subset of the storage commands, in some cases all the storage commands, are to be executed in accordance with the order in which they are received in the storage device (this order is referred to herein as "order-of-arrival"). The storage device executes the storage commands in the non-volatile memory in accordance with internal scheduling criteria, which generally permit deviation from the order-of-arrival in order to improve performance. At the same time, the storage commands in the subset are executed such that the order-of-arrival is reflected to the host.

Thus, from the host's perspective, the requested execution order is maintained. At the same time, the storage device is able to apply its internal scheduling criteria, which may deviate from the order-of-arrival, and thus reach high storage efficiency. For example, the storage device may schedule the storage commands for execution in multiple non-volatile memory devices out-of-order.

Several example techniques for utilizing the storage device's parallelism, while maintaining the order-of-arrival toward the host, are described herein. The disclosed techniques can be divided into two types: Techniques for the host to identify to the storage device which storage commands are to be executed according to the order of arrival, and techniques for the storage device to execute the storage commands in the requested order.

In some embodiments, the storage device executes the commands out-of-order, but acknowledges a given command and updates its internal tables only when all the commands that precede the given command are completed successfully. If a certain command fails, subsequent commands are disqualified and not acknowledged.

In other embodiments, data items provided in the storage commands are assigned respective sequence numbers. The memory device stores both the data items and the corresponding sequence numbers in the non-volatile memory, possibly out-of-order. Upon recovering from power interruption or other disruption, the storage device scans the sequence numbers in an attempt to find gaps that indicate command execution failure. If a gap in the sequence numbers is found, the commands whose sequence numbers follow the gap are disqualified.

In alternative embodiments, the host duplicates a barrier write command on all Input/Output (I/O) queues that are defined between the host and the storage device. When reading storage commands for execution from the queues, the storage device halts each queue upon reaching the barrier write command on the queue. When the barrier write command is reached on all queues, all the queues are released.

The methods and systems described herein enable the storage device to maximize its write performance, through the use of volatile write buffer and internal parallelism and scheduling criteria. At the same time, the disclosed techniques enable efficient and non-blocking execution of barrier write command and enforcement of execution order.

System Description

Figure 1:
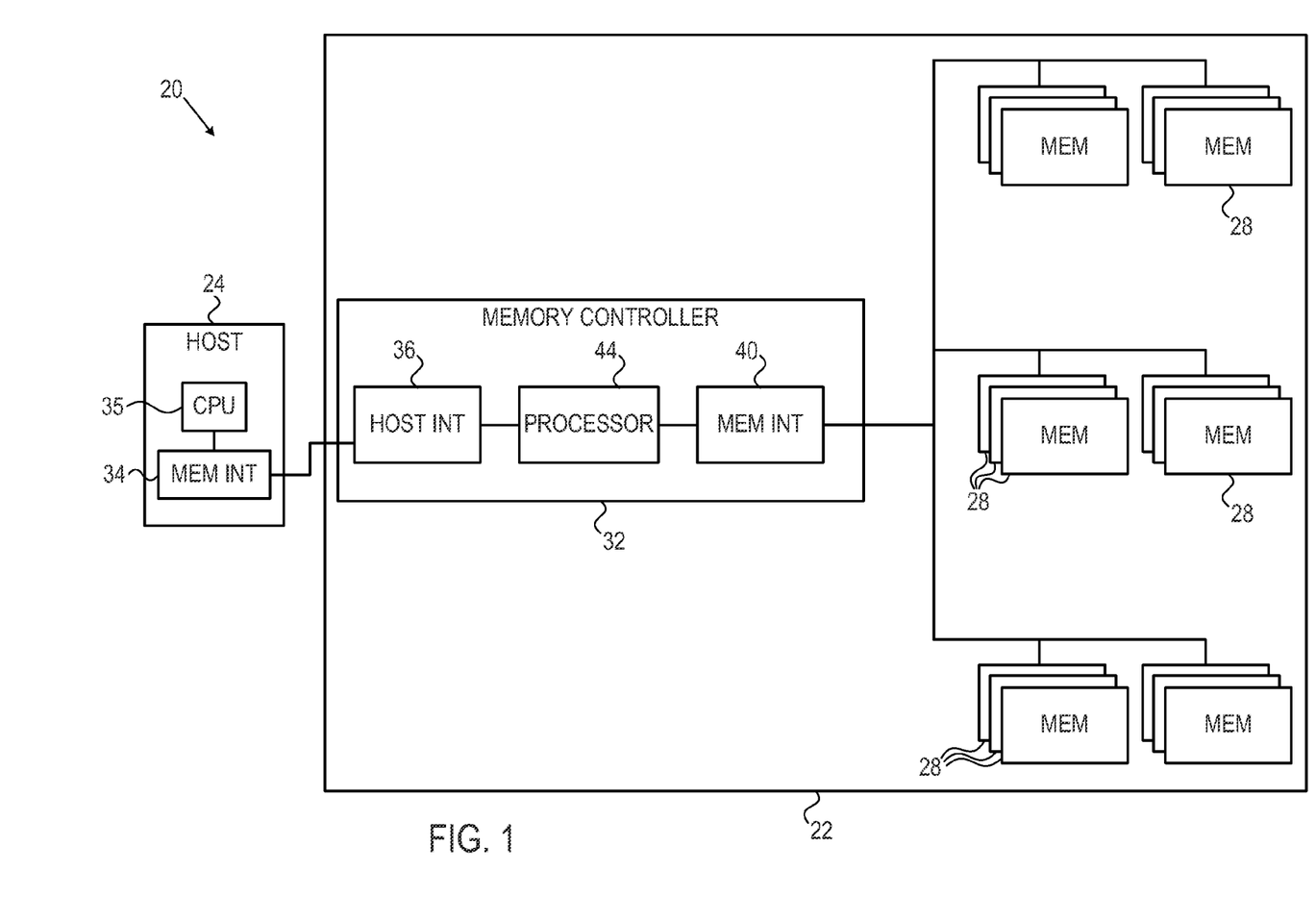
FIG. 1 is a block diagram that schematically illustrates a data storage system, in accordance with an embodiment of the present invention.

FIG. 1 is a block diagram that schematically illustrates a data storage system 20, in accordance with an embodiment of the present invention. System 20 comprises a storage device 22 and a host 24. Storage device 22 accepts data for storage from host 24 and stores it in non-volatile memory, and retrieves data from non-volatile memory and provides it to the host. The storage device and host may communicate with one another in accordance with any suitable storage protocol, such as SASA or NVMe, cited above.

In various embodiments, storage device 22 may comprise, for example, a Solid State Drive (SSD) that stores data for a personal or mobile computing device or an enterprise system, or a Micro-Secure Digital (μSD) card that stores data for a cellular phone, media player, digital camera or other host. In alternative embodiments, storage device 22 may be used in any other suitable application in which data is stored and retrieved and with any other suitable host.

Storage device 22 comprises multiple memory devices 28. In the present example, each memory device 28 comprises a respective Flash die that comprises multiple non-volatile analog memory cells. The memory cells may comprise, for example, NAND Flash cells, NOR or Charge Trap Flash (CTF) Flash cells, phase change RAM (PRAM, also referred to as Phase Change Memory-PCM) cells, Nitride Read Only Memory (NROM) cells, Ferroelectric RAM (FRAM) and/or magnetic RAM (MRAM) cells, or any other suitable memory technology.

In the present context, the term "analog memory cell" is used to describe any memory cell that holds a continuous, analog value of a physical parameter, such as an electrical voltage or charge. Any suitable type of analog memory cells, such as the types listed above, can be used. In the present example, each memory device 28 comprises a non-volatile memory of NAND Flash cells. The charge levels stored in the cells and/or the analog voltages or currents written into and read out of the cells are referred to herein collectively as analog values or storage values.

Storage device 22 stores data in the analog memory cells by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell.

The memory cells are typically arranged in rows and columns. Typically, a given memory device comprises multiple erasure blocks (also referred to as memory blocks), i.e., groups of memory cells that are erased together. In various embodiments, each memory device 28 may comprise a packaged device or an unpackaged semiconductor chip or die. Generally, storage device 22 may comprise any suitable number of memory devices of any desired type and size.

Storage device 22 comprises a memory controller 32, which accepts data from host 24 and stores it in memory devices 28, and retrieves data from the memory devices and provides it to the host. Memory controller 32 comprises a host interface 36 for communicating with host 24, a memory interface 40 for communicating with memory devices 28, and a processor 44 that processes the stored and retrieved data. For example, processor 44 may encode the data for storage with an Error Correction Code (ECC) and decode the ECC of data read from memory.

Host 24 comprises a memory interface 34 for communicating with storage device 22, and a Central Processing Unit (CPU) 35 that carries out the various host functions.

The functions of processor 44 and/or CPU 35 can be implemented, for example, using software running on any suitable CPU or other processor, using hardware (e.g., state machine or other logic), or using a combination of software and hardware elements.

Memory controller 32, and in particular processor 44, and/or CPU 35, may be implemented in hardware. Alternatively, the memory controller and/or host CPU may comprise a microprocessor that runs suitable software, or a combination of hardware and software elements. In some embodiments, processor 44 and/or CPU 35 comprise a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The system configuration of FIG. 1 is an example configuration, which is shown purely for the sake of conceptual clarity. Any other suitable memory system configuration can also be used. For example, in some embodiments two or more memory controllers 32 may be connected to the same host. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1, memory devices 28 and memory controller 32 are implemented as separate Integrated Circuits (ICs). In alternative embodiments, however, the memory devices and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which one or more of the memory devices are disposed. Further alternatively, some or all of the functionality of memory controller 32 can be implemented in software and carried out by host 24, or by any other type of memory controller. In some embodiments, host 24 and Memory controller 32 may be fabricated on the same die, or on separate dies in the same device package.

Data Inconsistency Scenarios Following Power Disruption

In some embodiments, memory controller 32 comprises a volatile write buffer (not shown in the figures). Processor 44 of memory controller 32 initially stores the data received from host 24 in the volatile write buffer, and later transfers the buffered data to non-volatile memory devices 28. Buffering of this sort increases write performance. For example, processor 44 may wait until the buffered data reaches a certain size (e.g., a full memory page), and then commit the buffered data in bulk.

Processor 44 typically acknowledges a storage command to host 24 as soon as the command is placed in the volatile write buffer, without waiting for successful execution of the command (e.g., successful transfer of data to non-volatile memory devices 28). If power disruption occurs, data that is buffered in the volatile buffer but not yet committed to memory devices 28 may be lost, even though successful storage was already acknowledged to host 24.

Moreover, processor 44 typically stores the data in the various memory devices 28 in accordance with certain internal scheduling criteria, in order to increase parallelism and improve write performance. The internal scheduling criteria of storage device 22 generally permit out-of-order execution, i.e., allow execution of storage commands in an order that differs from the commands order-of-arrival.

Because of the above features, when power disruption occurs, there is no guarantee as to which of the storage commands were executed successfully. In some cases, because of out-of-order execution, a certain storage command is executed successfully, but a later storage command is not. As a result, data inconsistency may develop between host 24 and storage device 22. Some applications, such as databases and operating system file systems, are especially sensitive to data inconsistency.

In order to demonstrate the effect of data inconsistency, consider an example scenario in which the file system in the operating system of host 24 moves a file. The file system first writes the data of the file to the new location, and then updates the File Allocation Table (FAT) to point to the new location of the data. Both the file and the FAT are stored in memory devices 28 of storage device 22.

Memory controller 32 acknowledges both the FAT update and the data update, since both are buffered in the volatile buffer. The FAT update in this example is committed first to non-volatile memory devices 28. Shortly after the FAT update is committed and before the data update is updated, a power interruption occurs. When power is resumed and the file system mounts again, the file system FAT points to the new location of the data, but the data does not exist there. The disclosed techniques prevent this and other scenarios, in an efficient and non-blocking manner.

In-Order Execution of Storage Commands Using In-Order Queue

Some storage protocols define multiple I/O queues as the means for sending storage commands from host 24 to storage device 22. The I/O queues are also referred to as command queues or simply queues for brevity. The NVMe protocol, for example, provides a flexible number of command queues, with different arbitration schemes among them. The I/O queues may reside in the host memory (as in NVMe, for example) or in the storage device (as in SATA, for example).

The execution order of storage commands read from a given queue is arbitrary—The memory controller of the storage device typically fetches the commands from a given queue in-order, but it is permitted to execute and complete them out-of-order. Out-of-order execution improves the storage device performance. The performance improvement is especially significant in read commands, and often less so in write commands.

In some embodiments, at least one of the command queues between host 24 and storage device 22 is defined as an in-order queue. The storage commands written by the host to the in-order queue are to be executed in-order, i.e., in accordance with the order in which they are fetched from the queue by processor 44 of memory controller 32. Commands written to the other queues may be executed in any desired order.

Host 24 typically writes order-critical storage commands to the in-order queue, and non-order-critical commands (e.g., read commands) to the other queues. Processor 44 reads the commands from the various queues and executes them in non-volatile memory devices 28. In particular, processor 44 executes and completes the commands fetched from the in-order queue according to their order-of-arrival. By handling the order-critical commands in a separate in-order queue, the execution order may be enforced for these commands, without blocking execution of the other commands.

Figure 2:
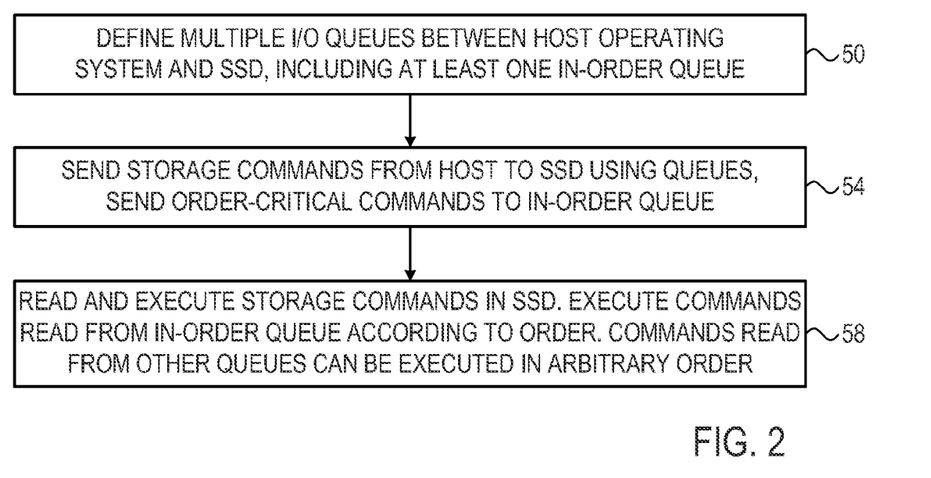
FIGS. 2-5 are flow charts that schematically illustrate methods for in-order execution of storage commands, in accordance with embodiments of the present invention.

FIG. 2 is a flow chart that schematically illustrates a method for in-order execution of storage commands, in accordance with an embodiment of the present invention. The method begins by defining multiple queues between host 24 and storage device 22, at a queue definition step 50. At least one of the queues is defined as an in-order queue whose commands are to be executed in the storage device in accordance with their order-of-arrival.

Host 24 sends to storage device 22 storage commands for execution, at a command sending step 54. The commands may comprise, for example, write and read commands. The host sends order-critical storage commands to the in-order queue, and other storage commands to the other queues.

Processor 44 fetches the storage commands from the various queues and executes the commands in non-volatile memory devices 28, at an execution step 58. Processor 44 executes the commands fetched from the in-order queue according to the commands' order-of-arrival, and the commands fetched from the other queues in arbitrary order.

Figure 3:
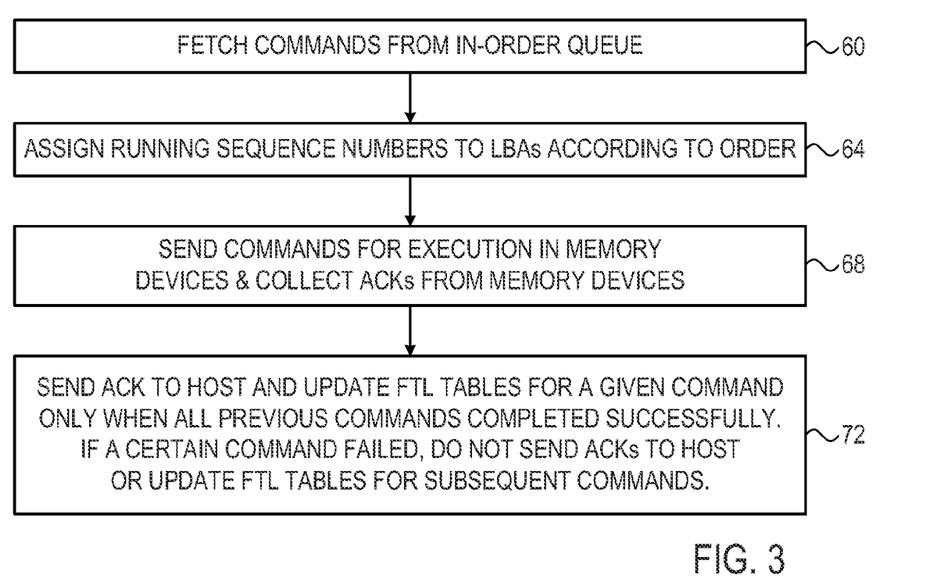
Figure 4:
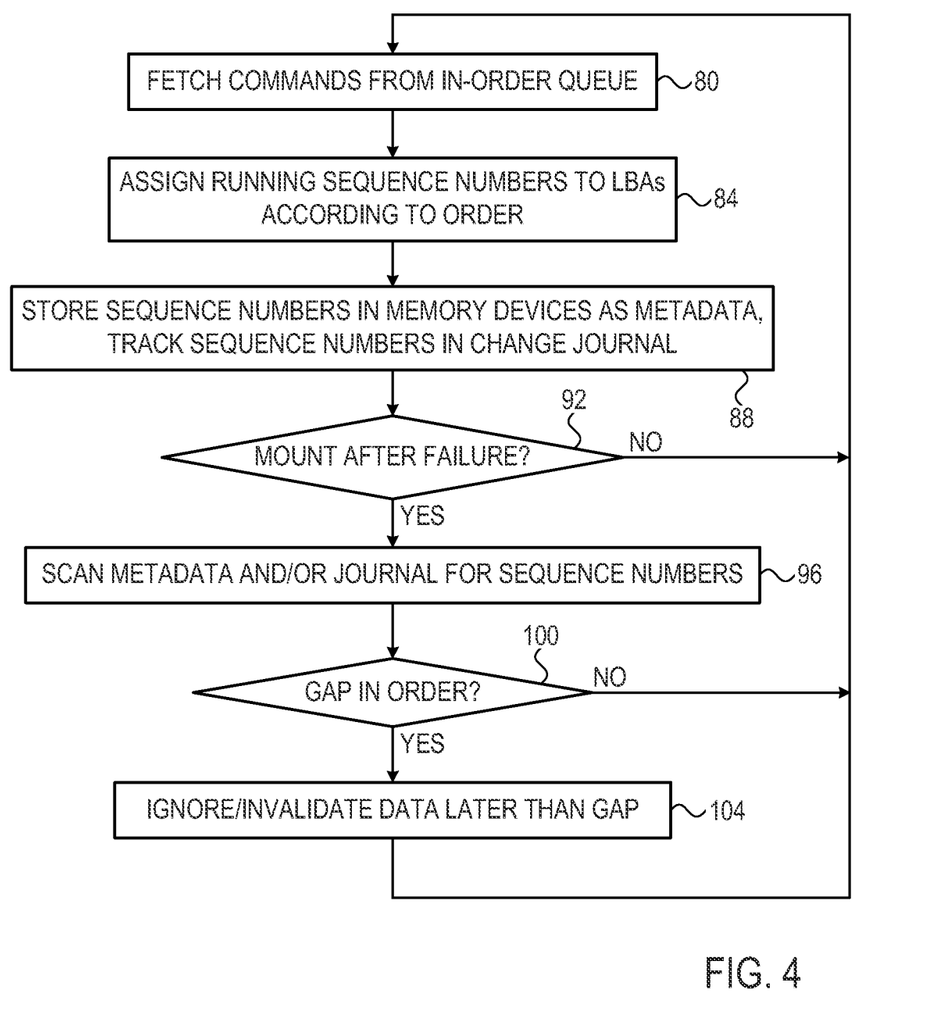

Processor 44 may use various techniques for enforcing in-order execution on the storage commands in the in-order queue, while at the same time exploiting the parallelism and internal scheduling criteria of the storage device. FIGS. 3 and 4 below present two example techniques. Alternatively, processor 44 may use any other suitable technique for this purpose.

Enforcing In-Order Execution in the Storage Device

FIG. 3 is a flow chart that schematically illustrates a method for in-order execution of storage commands, in accordance with an embodiment of the present invention. The method begins with processor 44 fetching storage commands from the in-order queue, at a command fetching step 60. Each storage command comprises one or more data items, in the present example Logical Block Addresses (LBAs), to be written or read in memory devices 28.

Processor 44 assigns each LBA a respective sequence number, at a sequence number assignment step 64. The running sequence numbers thus mark the LBAs of the commands read from the in-order queue in accordance with their order-of-arrival.

Processor 44 sends the storage commands for execution in non-volatile memory devices 28, and collects acknowledgements from the memory devices indicating successful execution of the commands, at a command execution step 68. Processor 44 typically sends the commands for execution to devices 28 in accordance with certain internal scheduling criteria that generally permit out-of-order execution. Moreover, different memory devices 28 may have different latencies in executing commands, e.g., because some devices are busier than others or for any other reason. Therefore, the acknowledgements from memory devices 28 may arrive out-of-order.

Processor 44 acknowledges the storage commands to host 24, at an acknowledgement step 72. Each acknowledgement sent to the host indicates successful completion of a respective storage command. In this embodiment, however, processor 44 acknowledges a given storage command, which was read from the in-order queue, only after all preceding commands in the in-order queue were also completed and acknowledged.

Similarly, processor 44 updates its FTL tables in response to the command (e.g., the mapping of logical addresses to physical storage locations in devices 28) only after all preceding commands in the in-order queue were also completed and acknowledged. Processor 44 is able to determine the appropriate order of storage commands from the sequence numbers that were assigned to the storage commands in the in-order queue.

Consider, for example, three successive commands whose sequence numbers are #1, #2 and #3. If command #3 finished execution before commands #1 and #2, the acknowledgement for command #3 will arrive from memory devices 28 first. Nevertheless, processor 44 will typically wait until it receives acknowledgements from devices 28 for commands #1 and #2, and only then acknowledge command #3 to host 24. Similarly, processor 44 will update its FTL tables in response to command #3 only after commands #1 and #2 are acknowledged by memory devices 28.

The delayed acknowledgement mechanism described above ensures that the storage commands in the in-order queue are executed in-order from the perspective of the host, and that data inconsistency will not occur in case of power interruption. Consider, for example, a scenario in which power interruption occurs after command #3 is executed and before commands #1 and #2 are executed in full. Since processor 44 will not receive acknowledgements from memory devices 28 for commands #1 and #2, it will not send an acknowledgement for command #3 to the host, and will not update its FTL tables in response to command #3. As a result, both the host and the storage device will be synchronized to the same state in which command #3 is not executed, and data consistency will be maintained.

FIG. 4 is a flow chart that schematically illustrates another method for in-order execution of storage commands, in accordance with an alternative embodiment of the present invention. The method of FIG. 4 begins similarly to the method of FIG. 3, with processor 44 fetching storage commands from the in-order queue at a fetching step 80, and assigning each LBA a respective sequence number at an assignment step 84. From this stage, the two solutions differ from one another.

Processor 44 stores the data of the received LBAs in memory devices 28, as well as the respective sequence numbers, at a data & sequence storage step 88. The sequence numbers are typically stored in devices 28 as metadata that is associated with the data of the respective LBAs. In an embodiment, processor 44 maintains a change-log journal that accumulates the changes in data and metadata in memory devices 28. In this embodiment, processor 44 records the sequence numbers in the journal, as well.

At any point during the process of steps 80-88, electrical power may be disrupted. At the time the power interruption occurs, some of the data may be committed successfully to memory devices 28. Other data may still reside in the volatile write buffer, and will therefore be lost. Because of the out-of-order execution, when storage device 22 recovers and re-mounts following the power interruption it cannot assume that the lost data is later in the order-of-arrival than the successfully-committed data.

Processor 44 checks whether it is now mounting following recovery from a power disruption, at a recovery checking step 92. If not, the method loops back to step 80 above in which processor 44 continues to fetch storage commands from the in-order queue. In case of re-mount, processor 44 scans the stored metadata in memory devices and/or the journal, at a scanning step 96. In this scan, processor 44 attempts to identify gaps in the sequence numbers, i.e., LBAs that were not committed successfully to the non-volatile memory and therefore their sequence numbers do not appear in the metadata or journal. As explained above, because of the out-of-order execution, the lost LBAs are not necessarily the LBAs having the highest sequence numbers.

Processor 44 checks whether a gap in the sequence numbers, at a gap checking step 100. If no gap is found, the method loops back to step 80 above. If a gap is found, processor 44 ignores and/or invalidates the data, metadata and journal changes that are later than the gap, at an ignoring step 104. Typically, the processor ignores or disqualifies the storage commands whose sequence numbers are higher than the gap. For example, if processor 44 scans the metadata and/or journal and finds commands #1, #2 and #4, it will ignore and disqualify command #4 even though it was executed successfully.

In other words, after re-mounting, processor 44 scans the non-volatile memory for the latest storage commands that were executed successfully without gaps. Processor 44 then synchronizes host 24 and storage device 22 to the same state, in which the storage commands following the gap are ignored.

The task of finding gaps in the sequence numbers may be time consuming, since it often involves scanning a large memory space. In some embodiments, processor 44 reduces this time by recording a sequence number that is known to have no preceding gaps. For example, if at some stage processor 44 concludes that no gaps exist up to sequence number #247, it may record this fact in non-volatile memory devices 28. When re-mounting following power interruption, processor 44 looks-up this record, and start scanning for gaps from sequence number #247 onwards. Processor 44 may record such sequence numbers at any desired time, e.g., periodically during programming.

In the description above, processor 44 assigns sequence numbers only to the commands read from the in-order queue. In alternative embodiments, no queue is defined as a dedicated in-order queue. Instead, processor assigns running sequence numbers to any storage command read from any of the command queues. In these embodiments, processor 44 stores the sequence numbers in the non-volatile memory for all storage commands, and performs recovery following power interruption in accordance with the method of FIG. 4 above.

Duplication of Barrier Command Across Multiple I/O Queues

In yet another embodiment, processor 44 enforces a desired execution order by duplicating barrier write commands across all I/O queues, so as to form a global synchronization point among the multiple queues.

Figure 5:
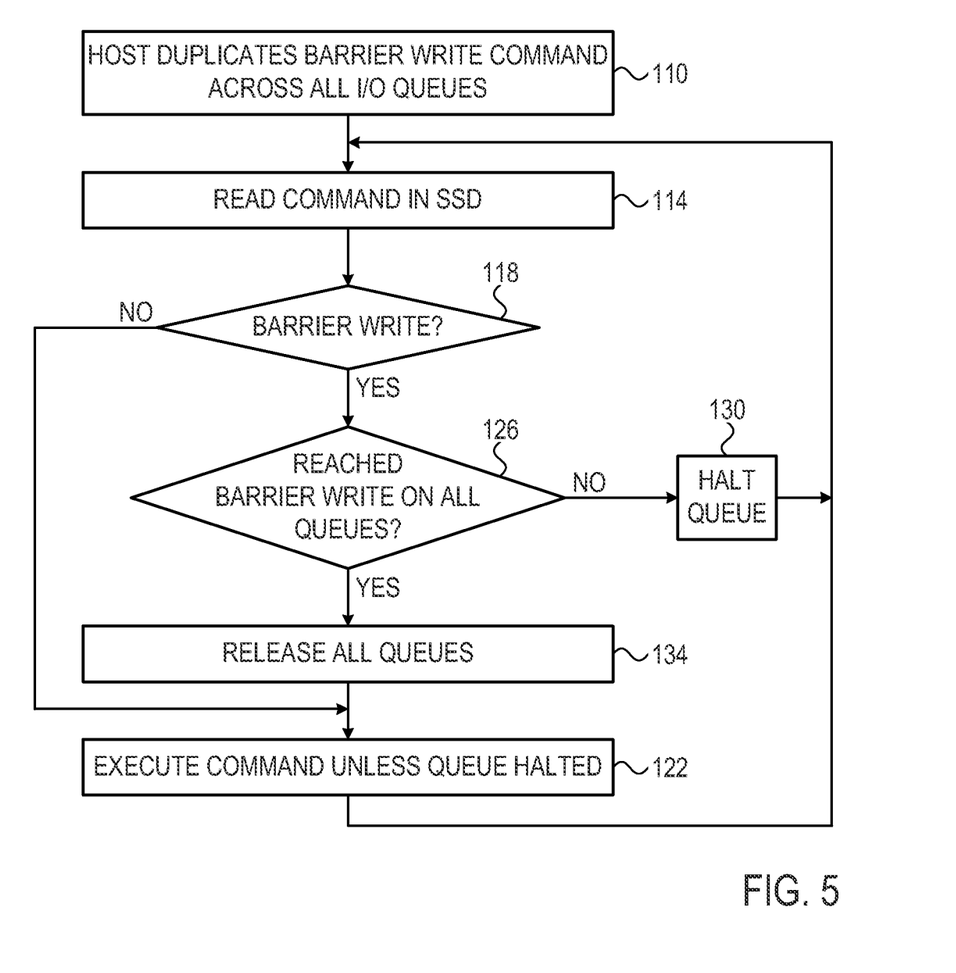

FIG. 5 is a flow chart that schematically illustrates a method for in-order execution of storage commands, in accordance with another embodiment of the present invention. When host 24 issues a barrier write command, the method begins with CPU 35 duplicating the barrier write command across all the I/O queues that are defined between host 24 and storage device 22, at a barrier duplication step 110.

Processor 44 reads a storage command from one of the queues, at a readout step 114. Processor 44 checks whether the command is a barrier write command, at a barrier checking step 118. If not, and unless the queue from which the command was read is halted, processor 44 executes the command in the non-volatile memory, at an execution step 122. The method then loops back to step 114 above in which processor 44 reads the next storage command from one of the queues.

If the command is a barrier write command, processor 44 checks whether this barrier write command was reached on all queues, at a global barrier checking step 126. If not, processor 44 halts the queue from which the command was read, at a halting step 130. The method then loops back to step 114 above. If the barrier command was reached on all queues, processor 44 releases all queues, at a releasing step 134, and proceeds to execute the command at step 122.

In an embodiment, processor 44 may implement step 126 by maintaining a counter that tracks the number of queues in which the barrier command was reached. The counter is incremented each time the barrier command is encountered in one of the queues (step 118). When the counter value reaches the total number of queues (step 126) then the processor releases all queues (step 134) and resets the counter. The method of FIG. 5 affects the performance of storage device 22 only when a barrier write command is encountered. Performance is unaffected in steady state.

The embodiments described in FIGS. 2-5 are chosen purely by way of example. In alternative embodiments, processor 44 of storage device 22 and/or CPU 35 of host may use any other suitable technique for executing storage commands in the non-volatile memory in accordance with internal scheduling criteria of the storage device, which permit deviations from the order-of-arrival, but such that execution of the storage commands reflects the order-of-arrival from the host's perspective.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   storing, in a plurality of queues, by a host, a plurality of storage commands for execution on a non-volatile memory of a storage device, wherein the plurality of storage commands include a respective barrier write command stored to each of the plurality of queues, and wherein at least a subset of the plurality of storage commands is to be executed in accordance with an order-of-arrival in which the subset of the plurality of storage commands is stored;
   reading, by the storage device, respective storage commands of the plurality of storage commands from each of the plurality of queues;
   assigning, by the storage device, a respective sequence number to each of the respective storage commands, wherein the respective sequence number marks each of the respective storage commands in accordance with a corresponding order-of-arrival;
   executing, by the storage device, the respective storage commands in accordance with internal scheduling criteria of the storage device, wherein the internal scheduling criteria permit deviations from the order-of-arrival, and wherein execution of the subset of the plurality of storage commands reflects the order-of-arrival from the host;
   wherein executing the respective storage commands comprises storing, in the non-volatile memory, respective data and the respective sequence number for each of the respective storage commands;
   ceasing reads of additional storage commands from a respective queue in response to reaching the barrier write command in the respective queue; and
   resuming reading of the additional storage commands in each queue of the plurality of queues in response to reaching the barrier write command in all of the queues of the plurality of queues.

2. The method according to claim 1, wherein executing the respective storage commands comprises permitting unblocked execution of the storage commands other than the subset concurrently with execution of the subset of the plurality of storage commands.

3. The method according to claim 1, wherein the non-volatile memory comprises multiple memory devices, and wherein executing the respective storage commands in accordance with the internal scheduling criteria comprises scheduling the respective storage commands for execution across the multiple memory devices.

4. The method according to claim 1, wherein reading the respective storage commands comprises receiving, from the host, an indication that distinguishes the subset of the plurality of storage commands from the plurality of storage commands other than the subset.

5. The method according to claim 4, wherein at least one of the plurality of queues is predefined as an arbitrary queue, wherein storage commands read from the arbitrary queue are permitted to be executed out-of-order, and wherein receiving the indication comprises reading the subset of the plurality of storage commands from a given one of the plurality of queues, wherein the given one is predefined as an in-order queue, wherein storage commands read from the in-order queue are to be executed in accordance with the order-of-arrival.

6. The method according to claim 1, wherein executing the respective storage commands in accordance with the internal scheduling criteria comprises acknowledging a given storage command to the host and recording an execution of the given storage command only upon successful completion of all storage commands of the subset of the plurality of storage commands that precede the given storage command in the order-of-arrival.

7. The method according to claim 1, further comprising:
   upon recovery from a power disruption in the storage device, identifying a gap in the stored sequence numbers; and
   disqualifying storage commands in the subset of the plurality of storage commands whose sequence numbers follow the gap.

8. The method according to claim 1, wherein ceasing reads of the additional storage commands from the respective queue comprises incrementing a counter in response to reaching the barrier write command in the respective queue, and wherein resuming reading of the additional storage commands in the plurality of queues comprises resuming reading in response to a value of the counter being greater than or equal to a total number of the plurality of queues.

9. An apparatus, comprising:
   an interface configured to receive, from a host, a plurality of storage commands for execution on a non-volatile memory, wherein at least a subset of the plurality of storage commands are to be executed in accordance with an order-of-arrival in which the subset of the plurality of storage commands is received;
   a plurality of queues configured to store the received plurality of storage commands, wherein the received plurality of storage commands include a respective barrier write command stored to each queue of the plurality of queues; and
   a processor configured to:
      read respective storage commands of the plurality of storage commands from each queue of the plurality of queues;
      assign a respective sequence number to each of the respective storage commands, wherein the respective sequence number marks each of the respective storage commands in accordance with a corresponding order-of-arrival;

execute the respective storage commands in accordance with internal scheduling criteria, wherein the internal scheduling criteria permit deviations from the order-of-arrival, and wherein execution of the subset of the plurality of storage commands reflects the order-of-arrival from the host;

store, in the non-volatile memory, respective data and the respective sequence number for each of the respective storage commands in response to the execution of each of the respective storage commands;

cease reading of additional storage commands from a respective queue in response to reaching the barrier write command in the respective queue; and resume reading of the additional storage commands in each queue of the plurality of queues in response to reaching the barrier write command in all of the queues of the plurality of queues.

10. The apparatus according to claim 9, wherein the processor is further configured to permit unblocked execution of the plurality of storage commands other than the subset concurrently with execution of the subset of the plurality of storage commands.

11. The apparatus according to claim 9, wherein the non-volatile memory comprises multiple memory devices, and wherein to execute the respective storage commands in accordance with the internal scheduling criteria, the processor is further configured to schedule the respective storage commands for execution across the multiple memory devices.

12. The apparatus according to claim 9, wherein the processor is further configured to receive from the host an indication that distinguishes the subset of the plurality of storage commands from the plurality of storage commands other than the subset.

13. The apparatus according to claim 12, wherein at least one of the plurality of queues is predefined as an arbitrary queue, wherein storage commands read from the arbitrary queue are permitted to be executed out-of-order, and wherein to receive the indication, the processor is further configured to read the subset of the plurality of storage commands from a given one of the plurality of queues, wherein the given one is predefined as an in-order queue, wherein storage commands read from the in-order queue are to be executed in accordance with the order-of-arrival.

14. The apparatus according to claim 9, wherein to execute the respective storage commands in accordance with the internal scheduling criteria, the processor is further configured to acknowledge a given storage command to the host and record an execution of the given storage command only upon successful completion of all storage commands of the subset of the plurality of storage commands that precede the given storage command in the order-of-arrival.

15. The apparatus according to claim 9, wherein the processor is further configured to:
upon recovery from a power disruption, identify a gap in the stored sequence numbers; and
disqualify storage commands in the subset of the plurality of storage commands whose sequence numbers follow the gap.

16. The apparatus according to claim 9, wherein to cease reading of the additional storage commands from the respective queue, the processor is further configured to increment a counter in response to reaching the barrier write command in the respective queue, and wherein to resume reading of the additional storage commands in each queue of the plurality of queues, the processor is further configured to resume reading in response to a value of the counter being greater than or equal to a total number of the plurality of queues.

17. An apparatus, comprising:
a non-volatile memory; and
a memory controller including a plurality of queues configured to store a plurality of storage commands, wherein the memory controller is configured to:
receive, from a host, the plurality of storage commands for execution on the non-volatile memory, wherein the plurality of storage commands include a respective barrier write command stored to each queue of the plurality of queues, and wherein at least a subset of the plurality of storage commands is to be executed in accordance with an order-of-arrival in which the subset of the plurality of storage commands is received;
fetch respective storage commands of the plurality of storage commands from each queue of the plurality of queues;
assign a respective sequence number to each of the fetched storage commands, wherein the respective sequence number marks each of the fetched storage commands in accordance with a corresponding order-of-arrival;
execute the fetched storage commands in accordance with internal scheduling criteria, wherein the internal scheduling criteria permit deviations from the order-of-arrival, and wherein execution of the subset of the plurality of storage commands reflects the order-of-arrival from the host;
store, in the non-volatile memory, respective data and the respective sequence number for each of the fetched storage commands in response to the execution of each of the fetched storage commands;
halt fetching of the respective storage commands from a respective queue in response to reaching the respective barrier write command in the respective queue; and
resume fetching of the respective storage commands in the respective queue of the plurality of queues in response to reaching the barrier command in all the queues of the plurality of queues.

18. A system, comprising:
a host, which is configured to issue a plurality of storage commands;
a plurality of queues configured to store the plurality of storage commands issued by the host, wherein the plurality of storage commands include a respective barrier write command stored to each queue of the plurality of queues, and wherein at least a subset of the plurality of storage commands are to be executed in accordance with an order-of-arrival in which the subset of the plurality of storage commands are received; and
a storage device including a non-volatile memory, wherein the storage device is configured to:
read respective storage commands of the plurality of storage commands from each queue of the plurality of queues;
assign a respective sequence number to each of the respective storage commands, wherein the respective sequence number marks each of the respective storage commands in accordance with a corresponding order-of-arrival;
execute the respective storage commands in accordance with internal scheduling criteria of the storage device, wherein the internal scheduling criteria permit deviations from the order-of-arrival, and wherein execution of the subset of the plurality of storage commands reflects the order-of-arrival from the host;

store, in the non-volatile memory, respective data and the respective sequence number for each of the respective storage commands in response to the execution of each of the respective storage commands;

halt reading of additional storage commands from a respective queue in response to reaching the barrier write command in the respective queue; and resume reading of the additional storage commands in each queue of the plurality of queues in response to reaching the barrier write command in all the queues of the plurality of queues.

\* \* \* \* \*